Sept. 2, 1969 W. H. KNAPP ET AL 3,464,419
END FEEDING ARRANGEMENT
Filed Oct. 31, 1966 3 Sheets-Sheet 1
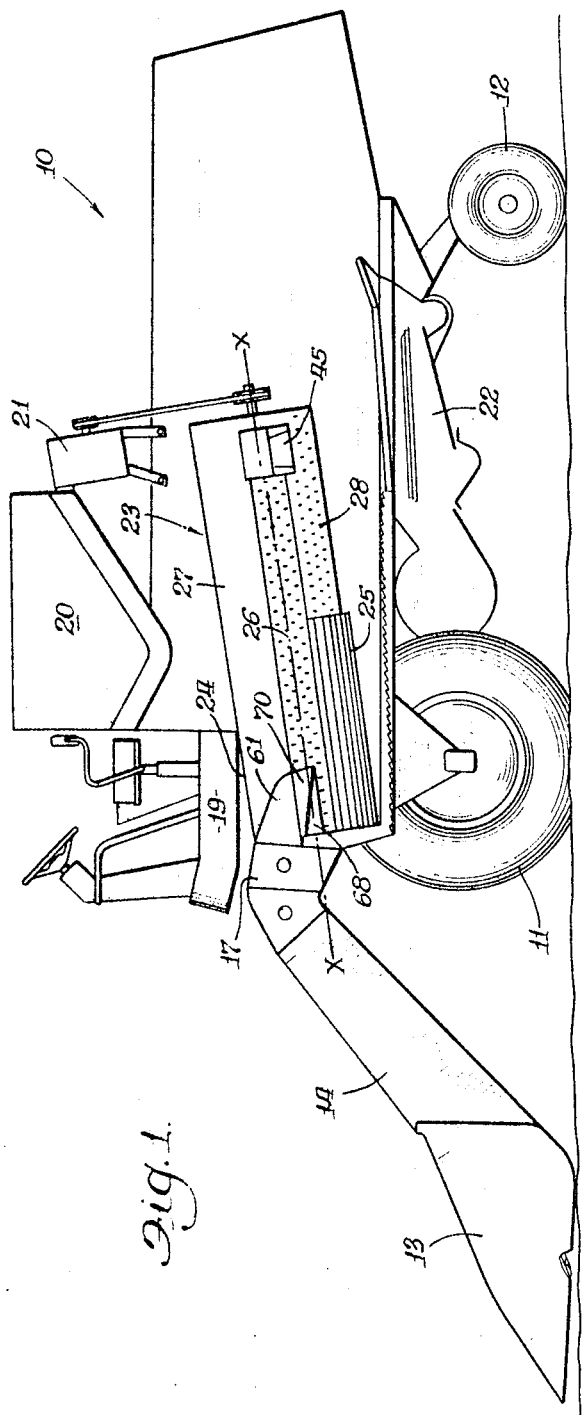
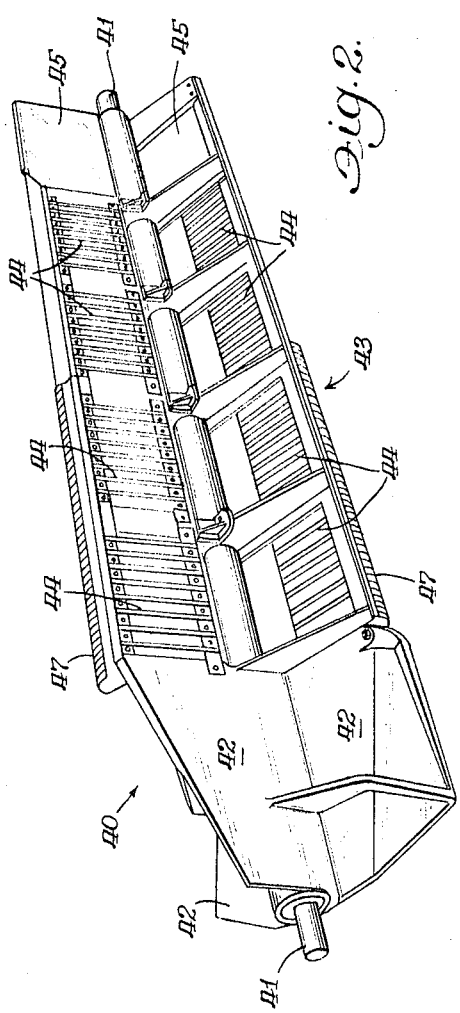
Inventors:
William H. Knapp
Caroll Q. Jochanour
Richard A. De Pauw Inventors:
William H. Knapp
Caroll Q. Jochanour
Richard H. DePauw Inventors:
William H. Knapp
Caroll Q. Hochanour
Richard A. De Pauw

United States Patent Office 3,464,419
Patented Sept. 2, 1969

3,464,419
END FEEDING ARRANGEMENT
William H. Knapp, Davenport, Iowa, and Caroll Q. Gochanour, Moline, and Richard A. De Pauw, East Moline, Ill., assignors to International Harvester Company, Chicago, Ill., a corporation of Delaware
Filed Oct. 31, 1966, Ser. No. 590,794
Int. Cl. A01f 12/10, 12/18
U.S. Cl. 130—27        13 Claims

ABSTRACT OF THE DISCLOSURE

An apparatus for controlling the material as it is fed axially into the receiving end of the cylinder of an axial flow combine. A contoured cowling forming a throat having a bottom surface above the axis of the axial flow combine cylinder.

---

The present invention relates generally to improvements in combines and the like and more particularly to a new and improved rotary or axial flow type combine having an end feed arrangement including fixed guides contoured to feed large volumes of unthreshed agricultural crops into the end area of a rotor processing unit.

In all present commercially available combines the material to be threshed is fed between a rotary cylinder and a stationary concave in a direction normal to the axis of the rotating cylinder. Much of the grain contained in the material fed to the cylinder and concave passes through the concave as threshed grain. The remainder of the material is conveyed to the separating components of the combine which in conventional combines includes reciprocating or oscillating straw racks, return pans, and chaffer sieves. This specific invention concerns a combine that operates on a completely different principle than the above described commercially available combines. In the combine described in the subject application an elongated rotor is provided along the longitudinal axis of the combine. The elongated rotor is enclosed within a cylinder having transport fins provided along its internal upper surface and a concave and grate provided along its lower surface. The material to be threshed is fed into the front end of the cylinder and is metered axially toward the rear for processing by the cooperating elements of the rotor and cylinder. An axial flow type combine such as this has the obvious advantage over conventional combines in the simplicity of its drive since it utilizes only simple rotary drives and does not include oscillating or reciprocating elements. This not only simplifies the drives for the separating section but also reduces vibrations considerably. Furthermore, the elements of an axial flow type separating section have better structural stability than those of conventional separating sections and is thus more durable and reliable. In axial flow combines the threshing and separating are both performed within the cylinder through the action of the rotor. Conventional rasp bars are mounted axially along the front section of the rotor where the threshing function is performed. In so constructing the threshing and separating section of the combine there is only one moving part in these sections, the rotor. The drive for rotating the rotor is obviously much simpler than the several drives required in the threshing and separating sections of conventional combines. A more complete disclosure of axial flow combines of the type described above can be found in the copending U.S. Patent applications of Rowland-Hill et al., Ser. No. 576,151, filed on Aug. 30, 1966, and Knapp, Ser. No. 588,191, filed on Oct. 20, 1966.

In axial flow combines the rotor revolves at a high rate of speed and there is a rather small clearance between the rotor and the casing thus making it difficult to introduce material into the casing. In the past the methods used to introduce material into the casing have resulted in excessive back feeding of materials and excessive power consumption. In some systems the clearance between the rotor and casing has been increased in the end feed area to facilitate feeding the material into the casing. However, threshing is reduced considerably in end feed areas of this type and a longer rotor and casing is thus required to obtain the desired threshing and separating.

The general purpose of this invention is to provide an end feed assembly for an axial or rotary thresher which embraces all the advantages of similarly employed end feed arrangements and possesses none of the aforedescribed disadvantages. To attain this the present invention contemplates feeding a sheet of material axially into the rotor through a contoured cowling having a throat located above the rotor axis.

An object of the present invention is to provide an end feed arrangement for an axial flow combine that will eliminate excessive back feeding of material.

Another object is to provide an end feed arrangement that will feed unthreshed agricultural crops uniformly into an axial flow combine.

A further object of the invention is the provision of an end feed arrangement for an axial flow combine that will achieve an inflow of air over the entire feeding throat area.

These and other objects of the invention will become more apparent from the specification and drawings, wherein:

FIGURE 1 is a side view of an axial flow combine having the side wall removed to expose the tubular casing;

FIGURE 2 is an isolated pictorial view of the elongated rotor;

Figure 3:
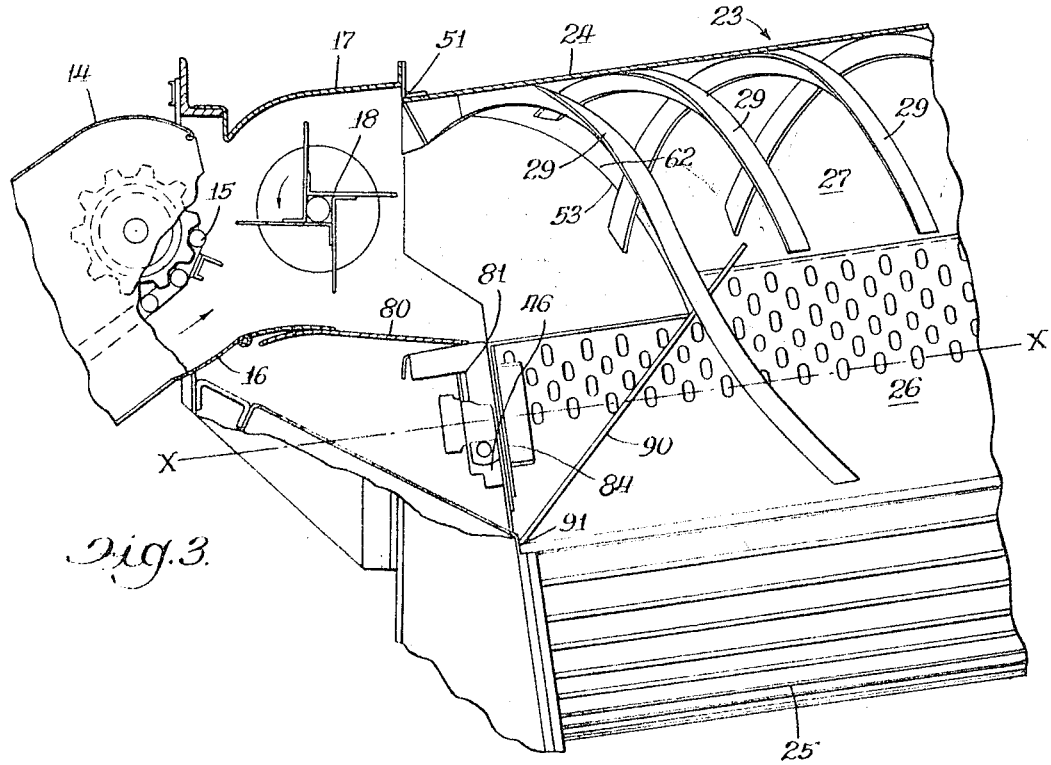
FIGURE 3 is a side view of the forward portion of the combine having the side wall and portions of the tubular casing cut away and with the rotor removed.

Referring now to the drawings wherein like reference characters designate like or corresponding parts throughout the several views there is shown in FIGURE 1 an axial flow type combine generally designated 10. The combine 10 includes conventional features such as drive wheels 11, steerable wheels 12, a pickup platform 13, a feeder 14, an operator's platform 19, a grain tank 20, an engine 21 and a cleaning system 22. As can be best seen in FIGURE 3 the feeder 14 houses an undershot conveyor 15 that elevates the harvested material from the pickup platform 13 and deposits it on a generally horizontal shelf 16 that forms the bottom of a feed housing 17. The housing 17 has mounted therein a transverse beater 18 that overlies the shelf 16 and a generally horizontal feed surface 80 that is an extension of the shelf 16. The beater 18 functions to compress the material and to convey it into the cowling.

The threshing and separating of the harvested agricultural crop is performed within a tubular casing 23 that is mounted on the combine along a generally horizontal axis designated X—X. The forward end 24 of the tubular casing 23 is located adjacent the housing 17. The generally horizontal axis X—X of the tubular casing extends below the generally horizontal feed surface 80.

The tubular casing 23 is made up of an upper portion 27 that extends the length of the tubular casing made from solid sheet material through which the harvested crop cannot pass. The sides of the tubular casing 23 are formed from fixed grate sections 26 that extend the length of the tubular casing and are formed from sheet material that is perforated to permit the passage of grain. The forward lower portion of the tubular casing is formed from a concave 25 through which the threshed grain can pass. The concave 25 terminates midway of the tubular casing and this surface is completed by a rear grate 28. A series of spiral transport fins 29 protrude from the internal surface of the upper portion 27.

Referring now to FIGURE 2 the elongated rotor 40 is shown in an isloated view. The elongated rotor 40 is journaled at each end on stub shafts 41. The stub shaft 41 extending from the front end of the elongated rotor is journaled in a bearing designated 46 as can be seen in FIGURE 3. The elongated rotor 40 as seen in FIGURE 2 has three radial impeller blades 42 on its front end portion. There is a radial arm 43 corresponding to each of the impeller blades 42. The surface of the radial arms 43 are formed from bar grates designated 44 and have solid portions 45 that function as fan blades at their rear end portions. The outer edges of the radial arms 43 have rasp bars 47 secured thereto. The rasp bars 47 terminate at the rear edge of the concave 25.

Figure 4:
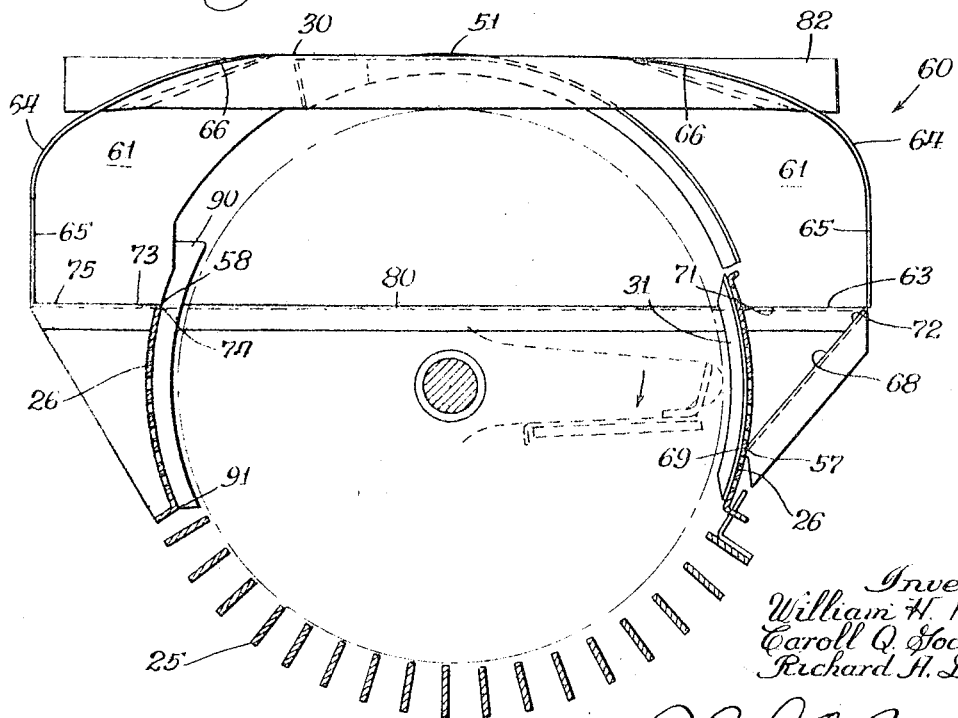
FIGURE 4 is a front view of the cowling portion of the tubular casing.

The forward end 24 of the tubular casing 23 has an irregularly shaped front inlet edge to which is connected a cowling means generally designated 60. A description of the tubular casing's inlet edge and the cowling 60 will be made with reference to FIGURES 3 through 6 inclusive. The first reference point along the inlet edge of the tubular casing is the summit 51 of the tubular casing. First and second lines 52 and 53 respectively diverge rearwardly and downwardly from the summit 51. The first line 52 reaches a point referred to as the first apex 54 and the second line reaches a point referred to as second apex 55. The first and second apices 54 and 55 are each located above the horizontal axis X—X of the tubular casing and the first apex 54 is located rearwardly of the second apex 55. The inlet edge continues from the first apex 54 along a vertical line 56 (see FIGURE 6) to a point below the horizontal axis X—X and then forward along a first parallel line 57. The inlet edge continues from the second apex 55 forward along a second parallel line 58. In FIGURE 4 the first and second parallel lines 57 and 58 respectively are seen as points. It should be noted that the first parallel line 57 is parallel to and below the generally horizontal axis X—X and that the second parallel line 58 is above and parallel to the generally horizontal axis X—X.

The cowling means 60 as disclosed herein is fabricated from several pieces of sheet material. However, it should be noted that it is the contour of the internal surfaces of these sheets that is critical to the proper functioning of the cowling. The cowling means could of course be constructed of a casing or other equivalent construction. The cowling means 60 has a pair of curved upper internal surfaces 61. The curved surfaces 61 have first edges 62 that are joined to the tubular casing along the first and second lines 52 and 53. The curved surfaces 61 have second edges designated 63 that diverge forwardly from the first and second apices 54 and 55. The curved surfaces 61 have third edges designated 64 that lie in a plane transverse to the horizontal axis X—X and define an inverted U-shaped rim. The inverted U-shaped rim can be best seen in FIGURE 4 and includes legs 65 and a bight portion 66.

Figure 5:
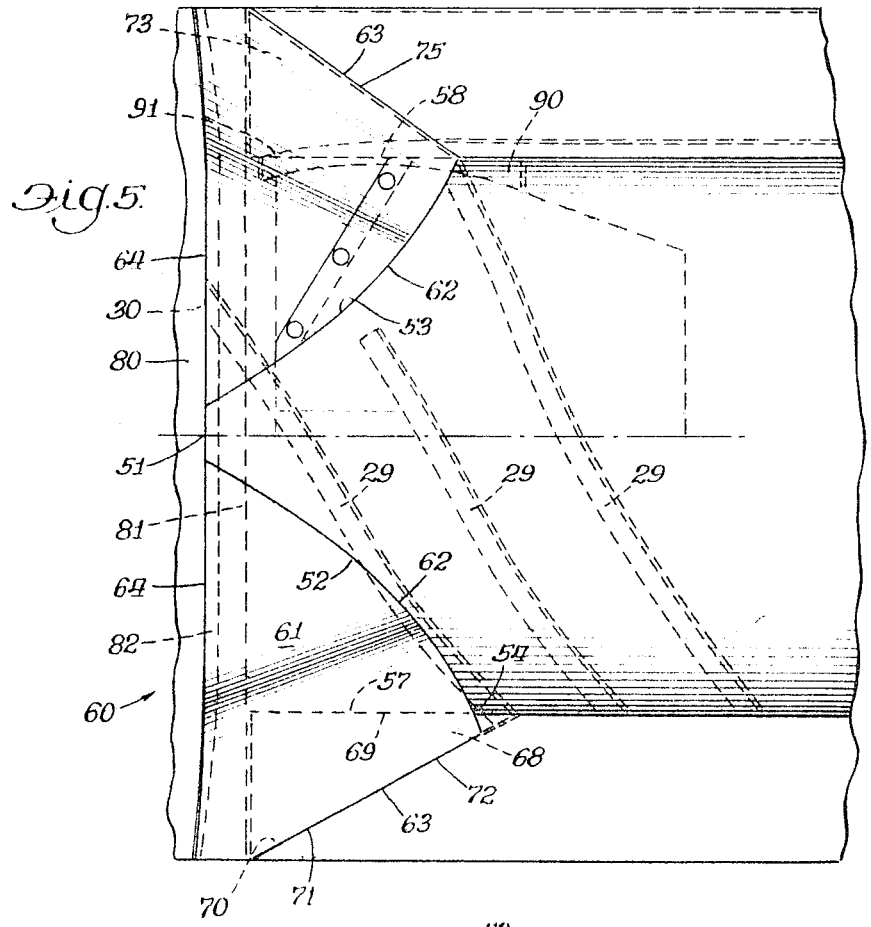
FIGURE 5 is a plan view of the forward end of the tubular casing and cowling portion.

The cowling means 60 further includes a first internal lower surface 67 that is made up of a bottom plate 68 and a side plate 70. The bottom plate 68 has a first edge designated 69 secured to the tubular casing along first parallel line 57. The side plate 70 has a second edge designated 71 that as seen in FIGURE 5 diverges forwardly from the apex 54 and is joined to the second edge 63 of curved surface 61. The bottom plate 68 is joined to the side plate 70 along a common edge 72.

The cowling means 60 further includes a second internal surface designated 73 having a first edge 74 that is joined to the tubular casing 23 along the second parallel line 58. The second internal surface 73 has a second edge 75 that is joined to the curved surface 61 along its second edge 63.

It should be noted that in FIGURE 4, first edges 69 and 74 appear as points. Also in FIGURE 4, the bottom plate 68 and second internal surface 73 appear as lines.

A generally horizontal feed surface designated 80 having a rear edge 81 extends across the open portion of the inverted U-shaped rim forming the lower portion of the cowling. The rear edge 81 defines the lower boundary of the tubular casings inlet opening.

Figure 6:
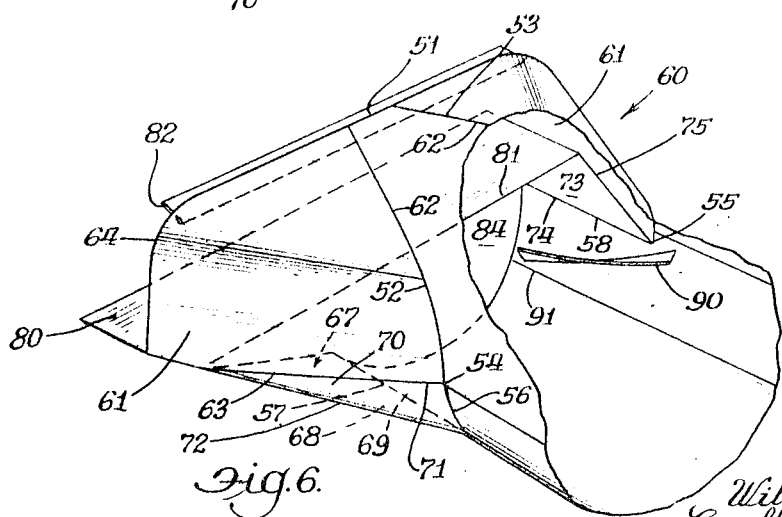
FIGURE 6 is an isometric schematic view taken from the rear of the tubular casing and cowling.

The bottom half of the tubular casing is closed by an end plate 84 as can be best seen in FIGURE 6. It should be noted that end plate 84 has been removed in FIGURE 4 to better illustrate lower surfaces 67.

An elongated stripper blade 90 protrudes from the internal surface of the tubular casing 23 commencing at a point 91 below the horizontal axis X—X at the forward end of the tubular casing and extends in a direction towards the second apex 55.

An elongated deflector flange 82 is secured to the inverted U-shaped rim of the cowling along the bight portion 66. The deflector flange 82 lies at an acute angle to the curved upper surfaces 61 and forms with the surfaces a pocket to deflect material and air currents.

The first transport fin in said series of spiral transport fins 29 begins at a point designated 30 adjacent the inverted U-shaped rim of the cowling means and offset from the summit 51 in the direction towards said second apex 55. The first transport fin is extended downwardly and rearwardly over the fixed grate 26 to insure that the material encountered by the impeller blades 42 as they are rising on the right-hand side of the tubular casing 23 is indexed rearwardly beyond the first apex 54. This is to prevent material from being back fed from the cowling onto the feed surface 80.

Operation

The agricultural crop to be harvested is severed and accumulated by the pickup platform 13 and is then elevated through the feeder 14 by the undershot conveyor 15. The undershot conveyor 15 deposits the material on the shelf 16 and the horizontal feed surface 80. The shelf 16 and feed surface 80 form the bottom of a housing 17 that is wider than the tubular casing 23. The material fed into the housing 17 by the undershot conveyor 15 is encountered by the beater 18 which rotates in a counterclockwise direction as seen in FIGURE 3. Thus a sheet of material is fed rearwardly below the beater 18. As this sheet of material progresses beyond the rear edge 81 of the feed surface 80 it encounters the impeller blades 42 of the elongated rotor 40 and the contoured surfaces of the cowling 60. Since the sheet of material is being fed axially of the elongated rotor 40 along a plane above the horizontal axis X—X it will encounter the impeller blades 42 moving downwardly on one side of the axis X—X and moving upwardly on the other side of the axis. For the purposes of this explanation the right-hand side of the tubular casing 23 will be considered the side to the right of the operator as he faces forward when on the operator's platform. The left-hand side of the tubular casing will thus be to the left of the operator as he faces forward when on the operator's platform. The rotor as seen in FIGURE 4 rotates in the clockwise direction. Thus the portion of the strip of material on the left-hand side of the axis designated X—X will encounter the impeller blades 42 moving downwardly and that portion to the right of the axis X—X will encounter the impeller blades 42 moving upwardly.

For the purposes of this explanation, the strip of material will be divided into halves, the left half and the right half. The left half of this strip of material enters the cowling 60 on the side having the first internal lower surface 67. The outer edge of the strip of material will fall by gravity toward the bottom plate 68 which is arranged such that the material will slide inwardly towards the tubular casing. The axial momentum of the material will continue to move it rearwardly and the side plate 70 will be encountered. The side plate 70 is arranged such that it will direct the material inwardly towards the tubular casing. Eventually this material will pass inwardly over the first parallel line 57 where it will be carried in a clockwise direction over the concave 25 by the rotor 40. As this material begins to move up the right-hand side of the tubular casing it will encounter the stripper blade 90 which will cause the material to move rearwardly towards the second apex 55. Thus all material fed into the left-hand side of the tubular casing will be carried down and across the concave and will be indexed rearwardly beyond the second apex 55 to insure that it cannot be back fed as the rotor moves upwardly from the second parallel line 58.

The outer edge of the material feeding into the right-hand side of the tubular casing 23 will be fed onto the flat second internal surface 73 from which it will be deflected inwardly by a curved upper surface 61. This material will be carried upwardly along the curved upper surface 61 and will be prevented from moving forwardly out of the cowling 60 by the deflector flange 82. The material will eventually encounter the spiral transport fins 29 and will be indexed rearwardly by this series of fins The first fin in this series of fins is extended downwardly and rearwardly over the fixed grate 26 on the left-hand side of the tubular casing to insure that this material is indexed rearwardly beyond the first apex 54.

It should be noted that the material fed into the left-hand side can travel in excess of 180° around the tubular casing before it reaches the second apex 55 while the material fed into the right-hand side must reach the first apex 54 in less than 180° of travel. For this reason the second apex 55 is located forwardly of the first apex 54 causing the material on the right-hand side to be deflected inwardly toward the axis X—X at a sharper angle than the material on the left-hand side.

Not only does the agricultural material fed into the cowling follow the rearwardly directed path described above but the air also follows this path. Thus a stream of air flows from the housing 17 through the cowling 60 and axially along the tubular casing. The dust and chaff created by the undershot conveyor 15 and the beater 18 is carried along with this stream of air and thus the problem of dust backing down the feeder 14 is minimized.

It should be understood, of course that the foregoing disclosure relates to only a preferred embodiment of the invention and that numerous modifications or alterations may be made therein.

What is claimed is:

1. In an axial flow combine comprising: a tubular casing formed about a generally horizontal axis and having a forward end through which unthreshed material is received;

an elongated rotor journaled for rotation about said horizontal axis within said casing, said elongated rotor having impeller blades on its forward end, said impeller blades shaped such that they exert an axial force component on the unthreshed material received in said tubuar casing through its forward end;

said tubular casing having an irregularly shaped front inlet edge, said inlet edge diverging rearwardly and downwardly from the summit to first and second apices, slightly above the horizontal diameter of said casing, and forwardly from the apices;

cowling means connected to the forward end of said tubular casing for directing the unthreshed material into said casing, said cowling means having curved upper internal surfaces including first edges connected to said tubular casing along the portion of said inlet edge that extends from the summit to the apices, internal lower surfaces having first edges connected to said tubular casing along the portion of said inlet edge that extends forwardly from said apices, said curved upper surfaces and lower surfaces each having second edges that intersect and are joined to each other along lines diverging forwardly from said apices, and a generally horizontal feed surface having a rear edge normal to and above said horizontal axis that defines the lower boundary of the casing's inlet opening.

2. The invention as set forth in claim 1 wherein said generally horizontal feed surface is wider in the transverse direction than said tubular casing and extends forwardly therefrom, a transverse beater overlying said feed surface in a position forward of said tubular casing.

3. The invention as set forth in claim 1 wherein said curved upper surfaces have third edges lying in a transverse plane and forming an inverted U-shaped rim, the legs of said inverted U-shaped rim being spaced apart a distance greater than the tubular casing and the bight portion of said inverted U-shaped rim being tangent to the summit of said tubular casing.

4. The invention as set forth in claim 3 wherein a deflector flange extends downwardly from the bight portion of said inverted U-shaped rim, said deflector flange lying at an acute angle to said curved upper surfaces forming a pocket to deflect material and air currents.

5. The invention as set forth in claim 1 wherein said inlet edge extends downwardly from said first apex to a point below said horizontal axis and forward from said point, and wherein said inlet edge extends directly forward from said second apex along a line parallel to said horizontal axis.

6. The invention as set forth in claim 5 wherein an elongated stripper blade protrudes from the internal surface of said tubular casing, said elongated stripper blade extending rearwardly and upwardly from a point below the horizontal axis at the forward end of the tubular casing in a direction towards said second apex.

7. The invention as set forth in claim 3 wherein said inlet edge extends downwardly from said first apex to a point below said horizontal axis and forward from said point, and wherein said inlet edge extends directly forward from said second apex along a line parallel to said horizontal axis.

8. The invention as set forth in claim 7 wherein a series of spiral transport fins protrude from the internal surface of the tubular casing along its upper portion, the first in said series of spiral transport fins commencing at a point, adjacent the inverted U-shaped rim of said cowling means and offset from the summit towards said second apex, and extending rearwardly over the summit towards said first apex.

9. The invention as set forth in claim 5 wherein said first apex is located rearwardly of said second apex.

10. The invention as set forth in claim 6 wherein said first apex is located rearwardly of said second apex.

11. The invention as set forth in claim 7 wherein said first apex is located rearwardly of said second apex.

12. The invention as set forth in claim 8 wherein said first apex is located rearwardly of said second apex.

13. The invention as set forth in claim 9 wherein a transverse beater overlies said feed surface in a position forward of said tubular casing.

References Cited

UNITED STATES PATENTS

| | | | |
|---|---|---|---|
| 953,833 | 4/1910 | Hollingsworth | 130—27 |
| 3,315,449 | 4/1967 | Morrison et al. | 56—21 |

ANTONIO F. GUIDA, Primary Examiner

U.S. Cl. X.R.

56—21